May 24, 1960  H. HODKINSON  2,937,723
DISC BRAKE
Filed June 18, 1957  2 Sheets-Sheet 2
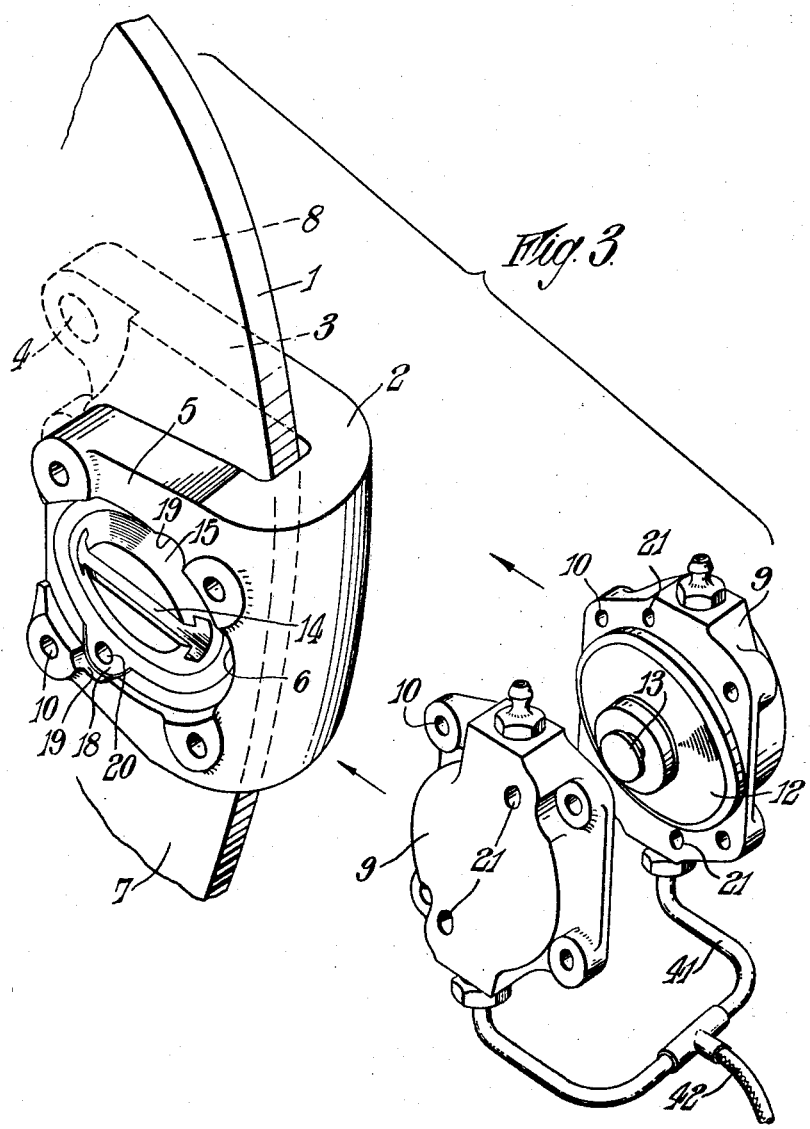
INVENTOR
Harold Hodkinson
by Benj. T. Rauber
his attorney

United States Patent Office 2,937,723
Patented May 24, 1960

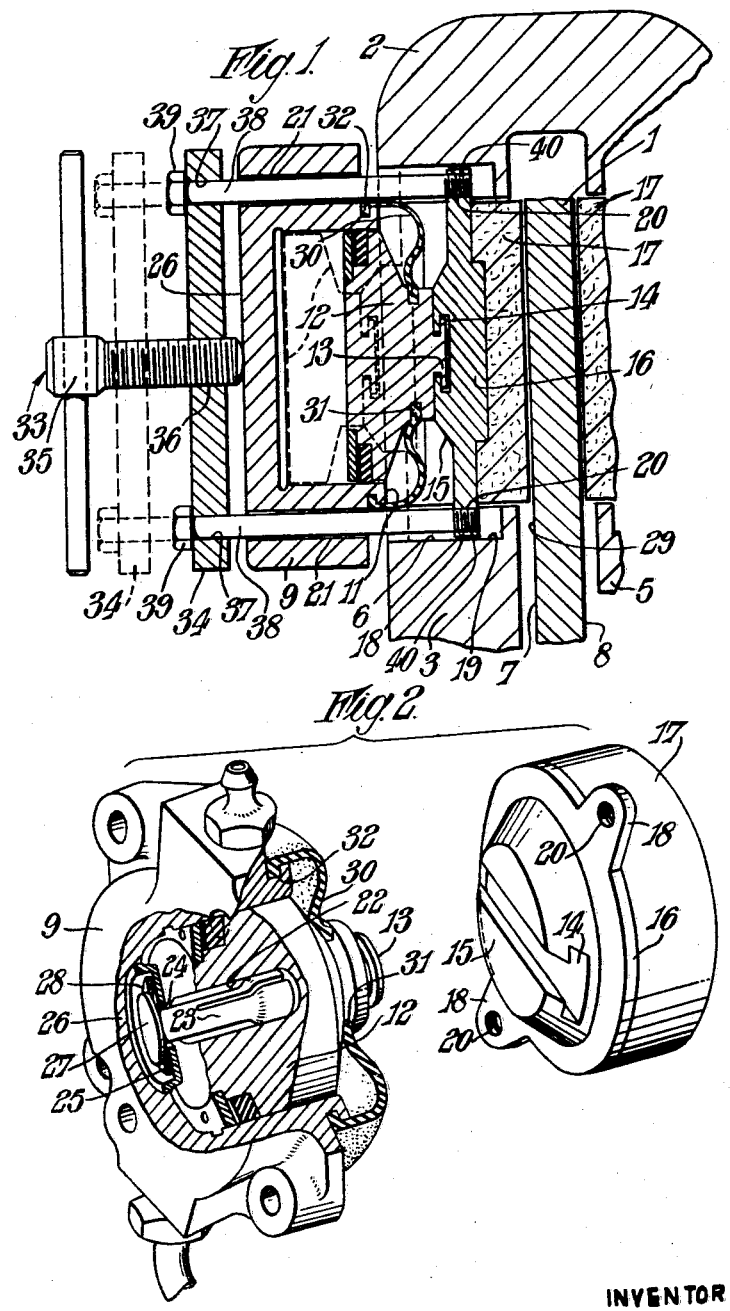

2,937,723
DISC BRAKE

Harold Hodkinson, Coventry, England, assignor to Dunlop Rubber Company Limited, London County, England, a British company Filed June 18, 1957, Ser. No. 666,413

11 Claims. (Cl. 188—73)

My invention relates to disc brakes, more particularly to disc brakes having a non-rotatable torque member in fixed axial position to a rotatable brake disc and having a friction pad and guide passageway extending normal to and close to an adjacent radial face of the disc. A disc pad and backing plate are slidably mounted in the guide passage and a cylinder having a piston slidable therein is mounted on the torque member in alignment with the guide passage. More particularly the torque member is a caliper type straddling the brake disc and having a guide passage, friction pad and backing plate, cylinder and piston on each side of the disc. A fluid supply conduit connects the cylinders on opposite sides of the disc and this conduit may be of rigid construction.

In my invention I provide an interlocking connection between the piston and the backing plate for each side of the caliper, such that the backing plate and piston are locked in fixed position axially of the guide passage so that they move as a unit but which permits sidewise disengagement of the piston from the backing plate when the piston is entirely withdrawn from the guide passage. When thus withdrawn the cylinder may be detached from the torque member and slid radially outwardly free from the friction pad and brake disc without disconnecting the cylinder from the fluid pressure supply connection. Thereupon the backing plate and friction pad may be withdrawn axially of the guide passage and replaced. This permits replacement of worn friction pads without disconnecting the cylinder from the fluid pressure connection.

My invention also comprises means for maintaining a close spacing of the friction pad from the face of the brake disc under all conditions of wear. The invention also comprises means whereby the friction pad and backing plate and piston may be withdrawn until the piston is entirely clear from the guide passage.

One embodiment of the invention is illustrated in the accompanying drawings, of which:

Figure 1 is a sectional view of one side of a brake incorporating the present invention showing means for re-setting the piston and withdrawing the brake pad to the piston-detaching position, Figure 2 is an exploded view, partly in section, of the detached piston and friction pad assembly, showing an automatic adjusting device associated with the piston, and Figure 3 is an exploded perspective view showing how the cylinders can be withdrawn without disconnection of the pressure lines.

In the illustrated embodiment of the invention (Figure 1) a vehicle disc brake comprises an annular disc 1 secured at its inner periphery to a vehicle wheel in the known manner and rotatable therewith. A non-rotatable caliper-type housing 2 straddles the outer periphery of the disc 1 and covers only a minor portion of the braking surfaces thereof, one limb 3 thereof being extended (Figure 3) and being secured to a non-rotatable part of the wheel assembly by suitable bolts passed through holes 4 in the limb 3. The two limbs, 3, 5 of the housing are each provided with a cylindrical aperture 6 therethrough, said apertures being axially-aligned one on each side of the disc 1 and being aligned also with the braking surfaces 7, 8 of the disc.

A cylinder 9 is secured, by bolts through holes 10, to each limb 3, 5 of the housing, said cylinder 9 being axially-aligned with its respective aperture 6, the open end 11 of the cylinder being presented towards the housing 2 and being spaced a short distance therefrom. A piston 12 is fluid-tightly slidable in the cylinder 9 and a space between the base of the cylinder 9 and the piston 12 is adapted to be connected to a source of fluid pressure, e.g. a master-cylinder, in the known manner.

The piston 12 is provided, on the side remote from the base of the cylinder 9, with an annular flange 13 which is T-shaped in section, and this engages in a complementary-shaped slot 14 extending transversely through a raised boss 15 on one side of a friction pad backing plate 16, the friction pad 17 being secured to the other side of the backing plate 16. The backing plate 16 is thus normally movable with the piston 12 and the piston may be disengaged from the backing plate by transverse movement in line with the slot 14 in the backing plate 16.

The backing plate 16 is substantially circular and is slidable with its friction pad 17 in the aperture 6 of the housing 2. It is also provided with two diametrically-opposed lugs 18 which are slidable in axially-extending grooves 19 in the sides of the aperture 6 extending to within a short distance from the end of said aperture 6 adjacent the disc 1. The lugs 18 are each provided with a threaded hole 20 extending axially therethrough and the wall of the cylinder 9 is also provided with two diametrically-opposed holes 21 axially-aligned with the holes 20 in the backing plate 16 and of slightly larger diameter.

The piston 12 is provided with a blind hole 22 (Figure 2) extending centrally into its base and a split pin 23 is fitted as an interference fit therein. The pin 23 projects outwardly from said base and passes through a hole 24 in a cap 25 secured centrally to the base 26 of the cylinder 9. The end of the pin 23 within the cap 25 is provided with a head 27, and a Belleville washer 28 is fitted between the cap 25 and the head 27 to normally force the head 27 against the base 26 of the cylinder 9. The head 27 of the pin 23 is able to make a limited movement only against the washer 28, and this distance is equivalent to the required clearance 29 between the associated pad 17 and the disc 1 when the brake is idle.

A moulded annular dust cap 30 of rubber or rubber-like material has its inner periphery 31 fitted in a groove in the outer side of the piston 12 and its outer periphery 32 fitted in a groove in the end of the cylinder 9. Its function is not only to prevent moisture and dirt from penetrating into the cylinder bore but also, due to its resilience, to force or tend to force the piston 12 towards the base 26 of the cylinder 9 against the force created by the head of hydraulic liquid.

The operation of the brake is as follows. An increase in pressure between the piston 12 and the base 26 of the cylinder 9, as, e.g. by operation of a master-cylinder, forces the piston 12 away from the base 26 of the cylinder. The split pin 23 moves with the piston 12, the head 27 thereof compressing the Belleville washer 28 against the cap 25. If full frictional engagement has not by then been effected between the friction pad 17 and the disc 1, the piston 12 slips on the pin 23 to allow said frictional engagement to take place. On removing the braking pressure the Belleville washer 28 forces the head 27 of the pin 23 back against the base 26 of the cylinder 9 and this, acting through the piston 12 and backing plate 16, moves the friction pad 17 a predetermined distance 29 clear of the disc.

As friction pad wear takes place the piston 12 moves progressively along the cylinder 9 and the backing plate 16 moves progressively down the aperture 6 in the housing 2 until the lugs 18 on said plate 16 bottom on the ends of the slots 19. When this occurs the friction pad 17 requires renewal. To effect this a fixture 33 is provided comprising a beam 34 (Figure 1) having a thumbscrew 35 threaded at 36 centrally therethrough and a hole 37 adjacent each end through each of which is passed a bolt 38 having a head 39 at one end and a threaded portion 40 at the other. The beam 34 is laid across the outside of the base 26 of the cylinder 9 and the two bolts 38 are each passed through the diametrically-opposed holes 21 in the cylinder and are screwed into the holes 20 in the lugs 18 of the backing plate 16. The thumb-screw 35 is then rotated to lift the beam 34 away from the base 26 of the cylinder 9 and this, acting through the bolts 38, moves the friction pad 17, backing plate 16 and piston 12 in the same direction, until the piston 12 has reached the end of its inward travel as shown in dotted lines in Figure 1. The fixture is then removed.

With the piston 12 in this position, the backing plate 16 is located at the outer end of the aperture 6 in the housing 2 and, on removing the bolts securing the cylinder 9 to the housing 2, the piston 12 and cylinder 9 as a unit may be slid off the backing plate 16 and clear of the aperture 6, as is shown in Figures 2 and 3. Movement of the piston 12 from its innermost position in the cylinder 9 is prevented by the interference fit of the pin 23 in the blind hole 22 in the piston and also by the resilient dust cap 30, either of which is strong enough to maintain the piston 12 in position against the head of hydraulic liquid.

The backing plate 16 and the remains of the friction pad 17 are then withdrawn from the aperture 6 and a new pad 17 is fitted to the backing plate 16. This assembly is then replaced, the flange 13 of the piston 12 is re-engaged with the groove 14 on the backing plate 16 and the cylinder 9 is re-bolted to the housing 2. This operation is performed on each individual friction pad assembly and when completed, the brake is once more ready for service.

Renewal of the friction pads can be performed very rapidly, since the hydraulic lines 41 are not disconnected. The cylinders of each pair are preferably connected into the hydraulic braking system by a length of flexible hose 42.

While an automatic adjusting device such as is illustrated in Figure 2 is to be preferred, this is by no means essential to the present invention, and a plain piston it the type shown in Figure 1 may be used without departing from the broad scope of the invention.

Having now described my invention, what I claim is:

1. A disc brake comprising a rotatable disc, a non-rotatable torque member having an axially positioned aperture therethrough, a pad of friction material axially slidable through and guided and retained in said aperture to frictionally engage a radially extending side of the disc, a backing plate secured to the friction pad and slidable in said aperture with said friction pad, a cylinder detachably secured to said torque member and having a connection to a source of fluid pressure, a piston fluid-tightly slidable in said cylinder and into said aperture, said piston being withdrawable to a position outside and clear of said aperture and said torque member, and means for releasably securing said piston to said backing plate to connect said piston and backing plate in axial movement and permitting said piston to be detached from said backing plate in a plane parallel with the plane of said disc when said piston is withdrawn and free of said aperture.

2. A disc brake according to claim 1 wherein said non-rotatable torque member comprises a caliper-like member straddling a portion of the periphery of said disc.

3. A disc brake according to claim 1 wherein said means for releasably securing said piston to said backing plate comprise a flanged portion on the head of said piston and a complementary-shaped groove extending diametrically across the adjacent face of said backing plate.

4. A disc brake according to claim 3 wherein said backing plate is formed with a protruding boss on the side thereof adjacent said piston and said groove is formed in said boss.

5. A disc brake according to claim 1 wherein said cylinder is removably secured to said torque member by bolts and said backing plate has formed thereon diametrically-opposed lugs each having a threaded hole therein and adapted to slide in axial mating recesses cut in the wall of said aperture in said torque member and extending inwardly thereof for a predetermined distance toward said disc so that said lugs are adapted to abut the ends of said recesses when said friction pad requires to be renewed.

6. The disc brake of claim 1 comprising an automatic adjustment device to maintain said friction pads at a constant retracted distance from said disc, said device comprising a blind hole formed axially in the base of said piston, a pin having a longitudinally split shank frictionally held in said blind hole and having a headed portion received with limited axial movement behind an abutment located inside the base of said cylinder, whereby said pin and said cylinder are adapted to move in unison through said limited axial movement, and whereby said frictional engagement is adapted to be overcome by movement of said piston for a distance greater than said axial limit, and means for moving said piston and said pin reversely from said disc in unison through said axial limit.

7. The disc brake of claim 6 comprising a convex Belleville washer disposed in the head of said pin within said abutment to define the limited axial movement of said piston.

8. A disc brake comprising a rotatable disc, a non-rotatable torque member having a guide passage normal to the radial face of said disc, a pad of friction material slidable in said passage to frictional engagement with said face of said disc and reversely out of said passage, a backing plate secured to said friction pad and movable therewith, a cylinder detachably secured to said torque member in alignment with said guide passage and a piston slidable in said cylinder and into said guide passage, said cylinder being withdrawable out of said guide passage and clear of said torque member and having a sidewise slidable interlocking engagement with said backing plate to hold said piston and backing plate in fixed axial engagement and to permit sidewise detachment when said piston is withdrawn clear of said guide passage.

9. The disc brake of claim 8 in which said interlocking engagement comprises a tongue and groove connection between said backing plate and said piston.

10. The disc brake of claim 9 in which said piston has a flange on its end opposite said backing plate and said backing plate has a complementary slot engaging said flange.

11. The disc brake of claim 8 in which said non-rotatable torque member is a caliper type member straddling said disc and in fixed axial position relative thereto and having guide passages on each side of said brake disc and in friction pads, backing plates and cylinders and pistons for each guide passage as defined in claim 8 and in which said cylinders are connected together by a fluid pressure connection.

(References on following page)

References Cited in the file of this patent

UNITED STATES PATENTS

| | | |
|---|---|---|
| 2,160,055 | Brace | May 30, 1939 |
| 2,568,858 | Kovac | Sept. 25, 1951 |
| 2,575,578 | Bricker | Nov. 20, 1951 |
| 2,754,936 | Butler | July 17, 1956 |

FOREIGN PATENTS

| | | |
|---|---|---|
| 201,668 | Australia | Apr. 20, 1956 |
| 1,117,453 | France | Feb. 27, 1956 |
| 761,479 | Great Britain | Nov. 14, 1956 |